United States Patent
Nyborg et al.

(10) Patent No.: US 6,773,605 B2
(45) Date of Patent: Aug. 10, 2004

(54) METHOD AND SYSTEM FOR CONTROLLING A SEPARATOR UNIT FOR MULTIPHASE SEPARATION OF FLUIDS

(75) Inventors: Knut Nyborg, Eiksmarka (NO); Nils Terje Ottestad, Tonsberg (NO)

(73) Assignees: Ottestad Breathing Systems AS, Husoysund (NO); Aker Engineering AS, Oslo (NO)

( * ) Notice: Subject to any disclaimer, the term of this patent is extended or adjusted under 35 U.S.C. 154(b) by 42 days.

(21) Appl. No.: 10/149,488

(22) PCT Filed: Dec. 14, 2000

(86) PCT No.: PCT/NO00/00429

§ 371 (c)(1),
(2), (4) Date: Oct. 17, 2002

(87) PCT Pub. No.: WO01/43867

PCT Pub. Date: Jun. 21, 2001

(65) Prior Publication Data

US 2003/0075511 A1 Apr. 24, 2003

(30) Foreign Application Priority Data

Dec. 14, 1999 (NO) .............................................. 996196

(51) Int. Cl.[7] .............................. B01D 17/02; G05D 9/00
(52) U.S. Cl. ....................... 210/741; 210/744; 210/800; 210/109; 210/513; 137/505.15
(58) Field of Search ................................ 210/741, 744, 210/800, 97, 109, 137, 513, 519; 239/269; 137/505.15; 166/267, 357

(56) References Cited

U.S. PATENT DOCUMENTS 3,731,071 A 5/1973 White et al.
4,252,649 A * 2/1981 Favret, Jr. .................... 210/800
4,684,456 A 8/1987 Van Driesen et al.
4,755,281 A 7/1988 Penick
4,824,579 A * 4/1989 George ........................ 210/703
4,951,700 A 8/1990 Kálmán
4,982,794 A 1/1991 Houot
5,032,273 A * 7/1991 Senyard et al. .......... 210/494.2
5,149,344 A * 9/1992 Macy ........................... 96/159
5,204,000 A * 4/1993 Steadman et al. .......... 210/519
5,542,417 A * 8/1996 Ottestad ................. 128/205.24
6,516,825 B1 * 2/2003 Ottestad et al. ............... 137/12
6,649,047 B1 * 11/2003 Ottestad ...................... 210/90
6,695,005 B2 * 2/2004 Ottestad ..................... 137/488

FOREIGN PATENT DOCUMENTS

GB 2 242 373 A 10/1991

* cited by examiner

Primary Examiner—Frank M. Lawrence
(74) Attorney, Agent, or Firm—Senniger, Powers, Leavitt & Roedel

(57) ABSTRACT

A method and a system for controlling a separator unit for multiphase separation of fluids of different densities, wherein either a pressure in the separator unit or a level of one or more of the liquids in the separator unit is adjusted in relation to a reference value. The reference value and the relevant pressure in the separator unit (1), or the level of the relevant liquid converted to a pressure, are supplied to either side of a pressure sensitive mechanical device (23; 28) which moves with deviations of the pressure from the reference value, and the movement is transferred directly to a mechanical control unit (22; 33) which is coupled to a control device (20; 38) on a fluid outlet (25; 37) from the separator unit (1), and which utilizes the difference between the pressure in the separator unit and the pressure downstream of the control device for moving this in the desired direction for correcting for the deviation.

11 Claims, 4 Drawing Sheets

METHOD AND SYSTEM FOR CONTROLLING A SEPARATOR UNIT FOR MULTIPHASE SEPARATION OF FLUIDS

This application is a 371 of International Application No. PCT/NO00/00429, filed on Dec. 14, 2000, which designated the United States of America.

FIELD OF THE INVENTION

The invention relates to a method and a system for controlling a separator unit for multiphase separation of fluids of different densities, wherein either a pressure in the separator unit or a level of one or more of the liquids in the separator unit is adjusted in relation to a reference value.

BACKGROUND OF THE INVENTION

Today, separators in connection with offshore oil and gas extraction traditionally are placed above water. However, for economical and extractional reasons, the development goes in the direction of a placement on or below the sea bed. The advantages herewith in principle will increase with an increasing ocean depth and an increasing distance from receiving plants for fluids from the separator, but simultaneously the complexity and costs associated with control and energy supply to the individual control devices will increase.

The control of the separator units for multiphase separation of fluids of different densities traditionally is carried out via complicated and resource-demanding, instrumented control loops. The conventional control loops normally will comprise measuring of a parameter value, and signal transmission to a regulator which compares the measured value with the reference value and decides the action which, in the form of a control signal, is sent back to the control device seeking to correct a possible deviation. The control device requires energy, something which for the traditional solutions involves an external supply via hydraulics, electric power or pneumatics. The most important regulating functions in connection with separation plants will be control of gas pressure and level control of liquids. Relevant control devices for example will be mains frequency controlled pumps and process control valves.

The level control systems which today are qualified for installation in an under-water separation plant, are relatively large and bulky, and in addition have a long response time. With increasing distances one will get an increased time delay. For relatively large separators one may be able to obtain a satisfactory stability of the respective parameters, even if the control loop is slow. For more compact separators the response time often will be significantly shorter, something which may turn out to be difficult to obtain with the qualified level measuring principles of today.

The main object of the invention is to provide a method and a system for achieving a simple, precise, robust and energy-economical mechanical control loop for pressure and level control of fluids in connection with different types of separators and tanks placed above or below sea level.

A more particular object of the invention is to provide a method and a system wherein the control loop for the process is substantially simpler and quicker than the control loops in separator plants according to the prior art, at the same time as external energy supply can be limited to possible signal lines to electronic pressure sensors and solenoids.

SUMMARY OF THE INVENTION

The above-mentioned objects are achieved with a method of the introductorily stated type which, according to the invention, is characterised in that the reference value and the relevant pressure in the separator unit, or the level of the relevant liquid converted to a pressure, are supplied to either side of a pressure sensitive mechanical means which moves with deviations of said pressure from the reference value, and that the movement is transferred directly to a mechanical control unit connected to a control device on a fluid outlet from the separator unit, and utilising the difference between said pressure in the separator unit and the pressure downstream of the control device for moving the device in the desired direction for correcting for the deviation.

According to the invention there is also provided a system of the introductorily stated type, which system is characterised in that it comprises a pressure sensitive mechanical means arranged to be supplied with the referent value and the relevant pressure in the separator unit, or the level of the relevant liquid converted to a pressure, to opposite sides of said means, and to be moved with deviations of said pressure from the reference value, and a mechanical control unit connected to the mechanical means and to a control device on a fluid outlet from the separator unit, and arranged to utilize the difference between said pressure in the separator unit and the pressure downstream of the control device for moving the device in the desired direction for correcting for the deviation.

In the method according to the invention there is established a reference value in the form of a pressure, and this reference value is compared with the actual pressure in the separator unit, or with the actual liquid level converted to a pressure. A possible deviation is converted directly to a mechanical movement which in turn is coupled to a mechanical control unit arranged to utilize the difference between the pressure of the separator chamber and the pressure downstream of the respective control device, to establish the force required by the control device in order to correct the deviation.

If the relevant well delivers gas, one will want to utilise the gas from the upper part of the separator tank as a driving medium for all the control devices. This is due to the circumstance that the gas will contain little contamination that may damage valve seals etc. It should otherwise be mentioned that the control devices will be able to be constructed in such a manner that they require a very small supply of driving medium as compared to the fluid flow controlled by the final controlling element. The driving medium therefore may be dumped into the process line downstream of the respective control devices without this having any practical influence on the separator functions.

It is necessary to construct the control devices such that a sufficient manipulated variable force is obtained also when the difference between the separator pressure and the pressure downstream of the relevant control device is at the lowest level, for example when a final controlling element in the form of a throttle valve is maximally open. This implies that one bases oneself upon pressure-balanced or little force-demanding valve devices, and that for possible other types of devices one provides for a sufficient manipulated variable force by increasing the surface influenced by the driving medium.

If special circumstances should dictate that it is not appropriate to use a fluid from the separator tank as a driving medium, one could alternatively utilise the pressure difference between a driving medium (e.g. hydraulic oil) supplied from the surface and the pressure downstream of the relevant control devices. This will enhance the price and complicate the operation of the separator, but one achieves the advantages of the invention in the sense that a deviation gives an approximately instantaneously correcting effect on the final controlling element because the control loop is based on a direct-acting mechanical connection.

Mechanised regulating processes according to the invention are based upon the actual value being compared with a reference value which is a combination of a spring tension and a pressure, the reference value being changed in that one or both of these parameters are changed. There will relatively seldom be a requirement to change the reference values for the liquid levels in the separator tank. It is more of interest to be able to change the reference value for the pressure in the separator tank in a simple manner. For practical reasons one will preferably choose to control this by means of electronic sensors. This is done by using a valve device which is arranged to change the pressure component of the reference value by means of a solenoid which alternatively provides for supply or discharge of fluid from a reference chamber in the device. The advantages of this method are that it is simple to change the pressure in the separator, at the same time as the external energy consumption for the regulation mainly is limited to a moderate current consumption for the operation of pressure sensors and solenoids. The technology for establishing such a reference pressure will be known to a person skilled in the art.

BRIEF DESCRIPTION OF THE DRAWINGS

The invention will be further described below in connection with exemplary embodiments with reference to the drawings, wherein.

DETAILED DESCRIPTION OF THE INVENTION

Figure 1:
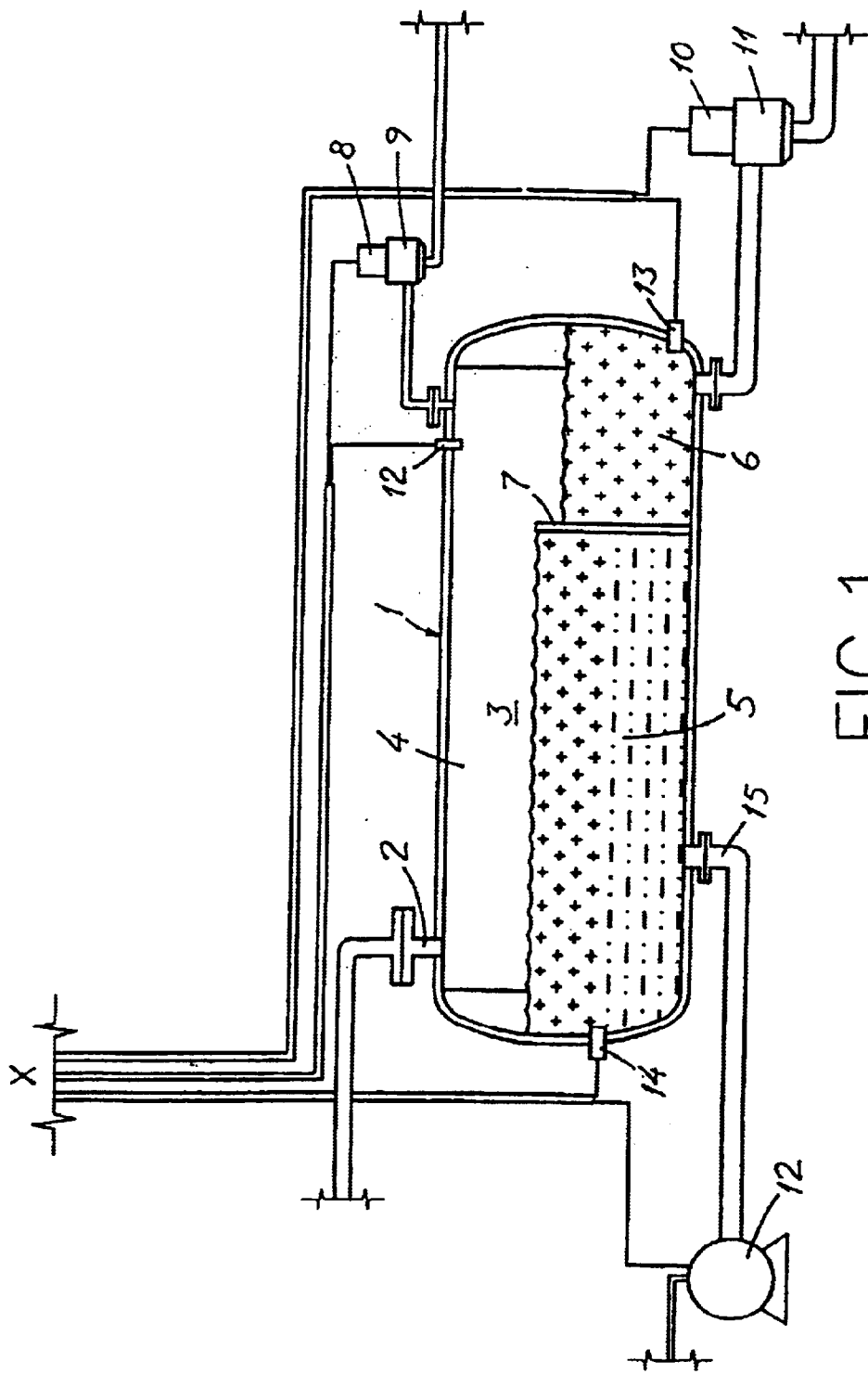
FIG. 1 shows a schematic view of a conventional separator unit for separation of the fluid from an oil well, whereby oil, gas and produced water are carried in separate lines.

FIG. 1 shows the main elements of a conventional separation plant for threes phase separation of a fluid from an oil well. The plant comprises a separator unit which is situated on or at the sea bed, and which comprises a tank 1 having an inlet 2 for the fluid from the oil well. The tank defines a separator chamber 3 comprising an upper or first chamber part 4 and lower, second and third chamber parts 5 and 6 which are separated from each other by a barrier or partition 7 projecting from the bottom of the separator chamber.

Gas will fill up the upper chamber part 4, whereas oil and water run into the second chamber part 5 where the difference in specific weight causes the water to sink to the bottom. Oil from the chamber part 5 will run over the barrier 7 and into the third chamber part 6. In a normal operating situation one wants to maintain as stabile operating conditions as possible. This implies that one seeks to control the discharge of the different fluids such that the pressure in the separator tank and the level of oil and water, respectively, in the respective chamber parts is as stabile as possible. In the illustrated example this is done by means of a pair of valve devices (control devices) 8, 9 and 10, 11 and a pump 12 which are controlled by their respective control units.

The valve device 8, 9 comprises an actuator 8 and a throttle valve (final controlling element) 9 which, controlled by its control unit (not shown) in cooperation with an electronic pressure sensor 12, regulates the pressure in the chamber part 4 and thereby the gas delivery from the separator.

Correspondingly, the valve device 10, 11 comprises an actuator 10 and a throttle valve 11 which, controlled by its control unit (not shown) in cooperation with a level gauge 13, regulates the oil level in the chamber part 6 and thereby the delivery of oil from the separator.

The pump 12 shall, controlled by its control unit (not shown) in cooperation with a level gauge 14, see to it that produced water is conducted away from the separator unit. Starting from the level measurement, the control unit of the pump will control the admission or manipulated variable of the pump so that the flow from the water outlet 15 of the separator tank is changed and the water level in the chamber part 5 is maintained at the desired level. The level control may be based on the admission of the pump being varied by the use of a mains frequency transformer. An alternative may be based on a mechanical transfer for controlling a viscose coupling between the pump and its motor. One may also manipulate the flow rate through the pump by means of a variable throttling upstream and/or downstream of the pump. Further, one may base oneself upon the pump having a fixed rotational speed and that the admission or manipulated variable is changed by means of a controlled leakage, for instance between the downstream and the upstream side of the pump. The leakage may also be carried to other parts of the process plant, or a fixed quantity may be recirculated and a variably quantity vented out of the system.

The above-mentioned control units for the valve devices and the pump form part of the control system of the separator unit situated at the sea level. The interface X in FIG. 1 illustrates how the respective measuring signals are transferred to the control system at the surface, and how an externally supplied driving medium is supplied to the control devices, whereafter in given cases it is returned to the energy source. This requires a complicated control system having a significant number of signal lines and pneumatic/electronic/hydraulic lines to the respective control devices.

Figure 2:
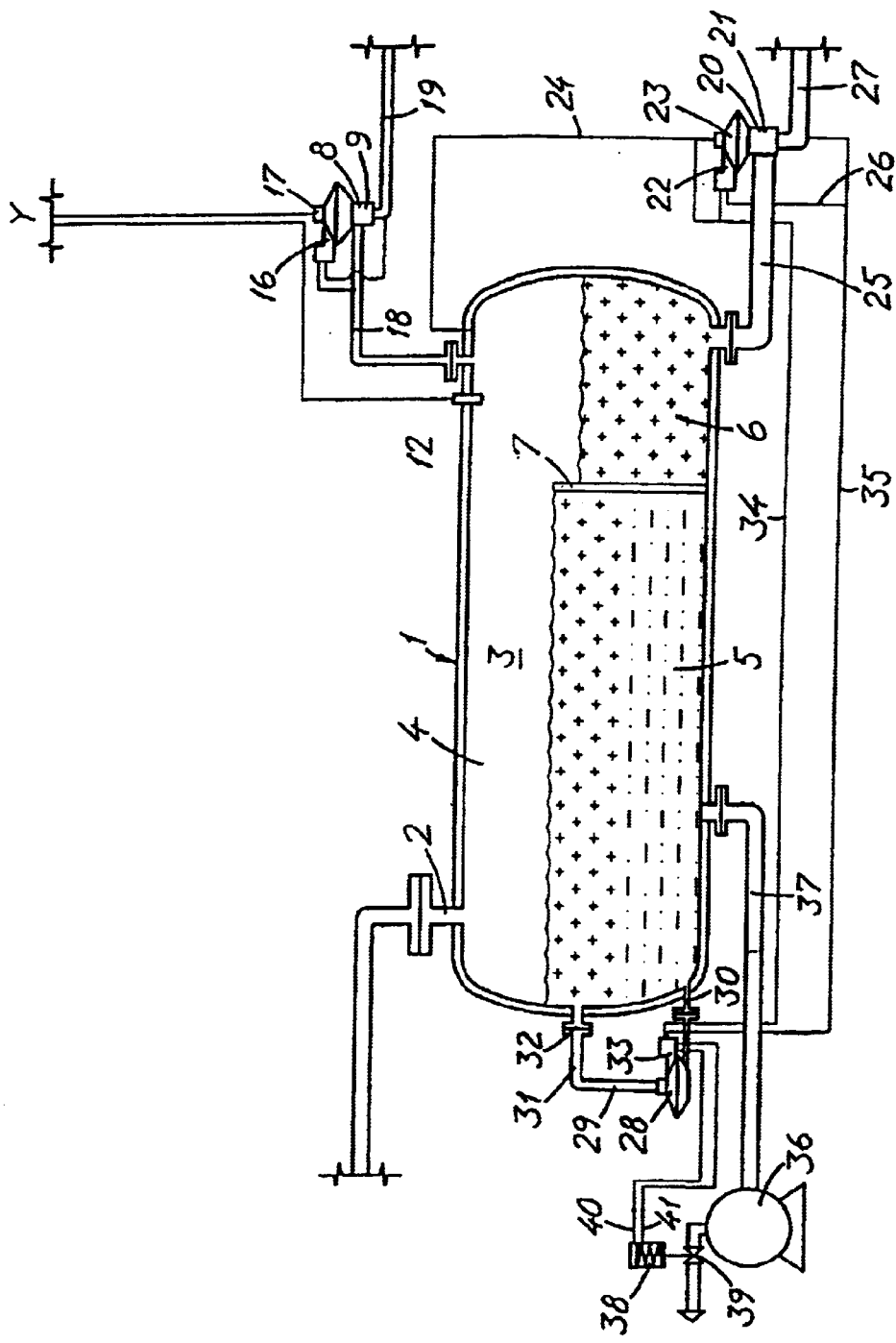
FIG. 2 shows a schematic view of an embodiment of a separator unit having a control system according to the invention, wherein one has chosen to use natural gas from the separator unit as a driving medium for the final controlling elements.

A separator unit which is provided with a control system according to the invention is shown in FIG. 2.

The separator tank proper corresponds to FIG. 1, and corresponding parts in the two figures consequently are designated by the same reference numerals.

In a manner corresponding to that of FIG. 1, the regulation of the pressure in the chamber part 4 is based on a valve device comprising an actuator 8 and a final controlling element in the form of a throttle valve 9 which, controlled by a control unit 16, regulates the pressure in the chamber part 4 by varying the gas delivery from the separator unit. The control unit 16 compares the actual gas pressure in the separator tank with a reference pressure, and sees to it that the throttle valve is set in a position wherein the pressure is maintained stable at the desired level.

The control unit 16 comprises a reference chamber (not shown) which, by means of a solenoid 17, may be connected to a gas inlet 18 at the upstream side of the throttle valve 9 or alternatively to a gas outlet 19 at the downstream side of the valve, so that the reference pressure may be raised or lowered dependent on the position of the solenoid. The solenoid is connected or disconnected by means of control signals from the surface, supplied via the interface Y. The control signals are dependent on the actual gas pressure which is sensed by means of the electronic pressure sensor 12.

The oil level in the chamber part 6 of the separator tank 1 and the water level in the chamber part 5 are controlled by means of respective mechanical control means which are constructed in accordance with the invention, and which will be further described below.

The oil level in the chamber part 6 is maintained stable by means of a valve device 20, 21 in cooperation with the mechanical control unit 22. As further described in connection with the embodiment shown in FIG. 3, the arrangement comprises a pressure sensitive mechanical means 23 comprising a diaphragm arranged such that it registers the hydrostatic pressure difference between the gas in the separator tank 1 and the oil at a given level in the chamber part 6. This pressure difference is registered via a line 24 from the upper chamber part 4 and an oil outlet line 25 from the chamber part 6, and is a measure of the oil level in the chamber part 6. The desired oil level is set by arranging a spring which influences the pressure sensitive diaphragm in the same direction as the gas pressure. The desired oil level then is defined as the level corresponding to the fact that the hydrostatic pressure of the oil just manages to balance the force from the spring and thereby places the sensor diaphragm in a neutral position, defined by the fact that there is no fluid flow in the mechanical control unit 22.

As appears from FIG. 2, the gas outlet line 24 is also connected to the mechanical control unit 22, so that the natural gas from the separator unit is used as a driving medium for the control unit. The control unit further comprises a discharge line 26 for the driving medium, and this line is connected as shown to an oil outlet 27 at the downstream side of the final controlling element 21 of the valve device 20, 21. This suitably consists of a throttle valve, as further described in connection with FIGS. 3–5.

The control of the water level in the chamber part 5 is based on the same principle, but requires a somewhat more complicated device as a result of the fact that, in the chamber part 5, there are two liquid phases of which the level of one phase is to be regulated. This is done in that a pressure sensitive sensor diaphragm in a mechanical means 28 which forms part of the arrangement, senses the hydrostatic pressure difference between a first liquid column having a defined specific weight influencing the upper side of the sensor diaphragm, and a second liquid column consisting of water and oil influencing the underside of the sensor diaphragm. The pressure from the first liquid column is supplied via a first outlet pipe 29 from a chosen level in the chamber part 5 below the upper edge of the barrier 7, whereas the pressure from the second column is supplied via a second outlet pipe 30 from the chamber part 5 at the bottom of the separator tank 1. The pressure on these two columns is identical from a common reference point 31 and further up to the gas-filled volume 4 in the tank. Since water has a higher density than oil, the pressure influencing the underside of said diaphragm will increase with an increasing water level in the tank. The pressure difference which is sensed, therefore is a measure of the water level in the tank. In a manner corresponding to that of adjusting the oil level, the water level is adjusted by arranging a spring which influences the pressure sensitive diaphragm in a direction causing it to be in a neutral position at the desired water level.

For ensuring that the density of the water column between the upper side of the sensor diaphragm and the reference point 31 is not changed, a preferred embodiment is based upon this liquid column being locked in between said sensor diaphragm and a compliant diaphragm (not shown) arranged in a flange 32 inserted into the outlet pipe 29 between the sensor diaphragm and the separator tank 1.

The pressure sensitive means 28 cooperates with a mechanical control unit 33 which is of a similar construction as the control unit 22, and which is driven by the same driving medium as this unit, i.e. the gas from the separator tank 1. Thus, the supply line 24 for driving medium to the control unit 22 is coupled to a supply line 34 for driving medium to the control unit 33, whereas a discharge line 35 from the control unit 33 is coupled to the discharge line 26 coming from the control unit 22 and being connected to the oil outlet 27 at the downstream side of the final controlling element 21.

In the embodiment according to FIG. 2, the water delivery from the separator tank 1 is controlled by means of a pump 36 which is connected to the chamber part 5 via an outlet pipe 37. The outlet of the pump is controlled by the control unit 33 via a control device in the form of a valve device 38, 39 comprising an actuating drive in the form of an actuator 38 affecting a final controlling element in the form of a throttle valve 39. As further described in connection with FIG. 3, the control unit 33 includes two outputs which are connected to the actuator 38 via respective lines 40 and 41.

It is to be emphasised that FIG. 2 is a pure principle drawing. For example, the above-mentioned level control for the water will be based on measuring points situated quite close to the barrier 7, and not just below the inlet 2 for the fluid in the oil well. In this region there will be strong whirls preventing oil and water from being separated, and in addition resulting in unstable pressure conditions. Different separator tanks may have different internal divisioning and a different number of inlet and outlet pipes. It is also to be empasised that the mechanical control means according to the invention may be adapted to other types of final controlling elements than for example throttle valves.

The following calculation example shows the forces which may be generated via the sensor diaphragm in order to control the regulation:

It is supposed that the diaphragm has an effective pressure surface corresponding to D=150 mm, which gives an area equal to 177 cm$^2$. It is further supposed that the water level departs with 5 cm from the desired value. The density of the oil typically will be about 0.7 g/cm$^3$, whereas the density of water is 1 g/cm$^3$. If 5 cm of the water column is replaced by oil, the pressure change will correspond to (1–0.7)×5 ponds/cm$^2$=1.5 ponds/cm$^2$. This implies that the diaphragm is subjected to a correcting force of K=177×1.5 ponds=265 ponds.

A mechanical control unit according to the invention needs a substantially smaller force than this in order to be able to establish a maximum manipulated variable or admission which, in principle, is determined by the difference between the pressure in the upper part of the separator tank and the pressure at the point where the driving medium is dumped. If, for example, one presupposes that this pressure difference is 2 bar, one will obtain, against a pressure surface corresponding to 100 cm$^2$, a maximum manipulated variable force corresponding to 200 kponds. Relevant control devices may be constructed so that they will be able to operate with a substantially smaller force than this.

In the separator unit according to FIG. 2 one has chosen to control the water discharge by means of an electric pump 36 carrying the water to a deposit at the surface. Further, one has chosen to stabilise the water level by coupling the mechanical control unit 33 and the valve device 38, 39 in a manner causing an increasing throttling of the outlet of the pump with a decreasing water level, and vice versa. In this situation the downstream pressure of the pump is higher than the pressure in the separator tank 1. In order to have a sufficient force to operate the control device 38, 39, it is therefore appropriate to dump the driving medium downstream of the valve device 20, 21, as shown in FIG. 2, or possibly downstream of the valve device 8, 9.

Figure 3:
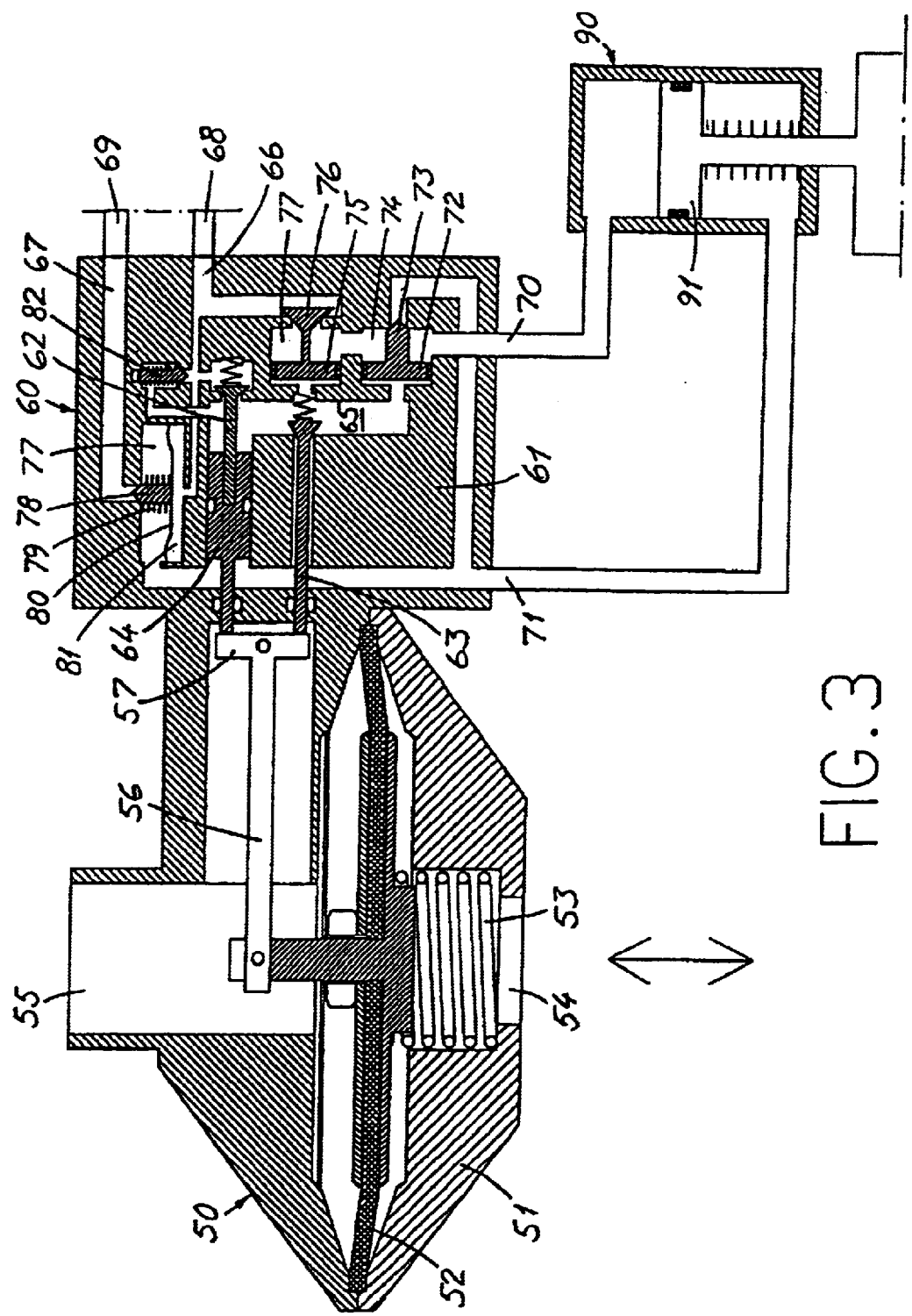
FIG. 3 shows a schematic view of a preferred embodiment of a mechanical control unit for a control device in the control system according to the invention.

FIG. 3 shows a preferred embodiment of the mechanical control unit forming part of the system according to the invention. The arrangement is here adapted to an embodiment for stabilising the water level in the chamber part 5 of FIG. 2.

As shown, the arrangement comprises a pressure sensitive mechanical means 50 comprising a housing 51 in which there is arranged a diaphragm 52 which is preloaded by means of a spring 53. The housing 51 has a lower inlet 54 communicating with the underside of the diaphragm 52, and an upper inlet 55 communicating with the upper side of the diaphragm. The lower inlet 54 here is intended for connection to the outlet pipe 30 of the separator tank 1, whereas the upper inlet 55 is intended for connection to the outlet pipe 29 of the tank. During operation the underside of the diaphragm 52 then will sense the liquid pressure at the bottom of the chamber part 5, whereas its upper side will sense the pressure from the liquid-filled outlet pipe 29. Deviations in the water level in the chamber part 5 in relation to the desired level then is registered as a displacement of the sensor diaphragm 52.

In accordance with the invention, and as stated in the introduction, the movement of the pressures sensitive means, i.e. the sensor diaphragm 52, is transferred directly to a mechanical control unit which is connected to a control device on a fluid outlet from the separator unit, and which utilises the difference between the pressure in the separator unit and the pressure downstream of the control device for moving this in the desired direction in order to correct for the sensed deviation. For this purpose the sensor diaphragm 52 in the illustrated embodiment is coupled to one end of a transfer arm 56 of which the other end as shown is formed with a centrally supported lever 57 which is arranged to cooperate with a valve device forming part of the mechanical control unit. This unit in its entirety is designated by the reference numeral 60 and comprises a housing 61 in which said valve device and the remaining elements of the unit are arranged.

The valve device comprises first and second valve bodies 62 and 63, respectively, which are arranged to be influenced by respective ends of the lever 57, the first valve body 62 being coupled to the lever via a cylinder-shaped piston 64 which is slidably arranged in the housing 61 as shown in FIG. 3. The valve bodies 62, 63 control inflow and outflow of driving medium respectively to and from a valve chamber 65, as further described below.

As mentioned above, the unit 60 is arranged to influence a control device arranged on a fluid outlet from the separator tank 1. The pressure forces used for establishing the necessary energy for the manipulated variable, are provided in that the upper chamber part 4 of the separator tank and the downstream side of the control device (throttle valve) in question are connected to a respective one of two channels or ducts 66 and 67 arranged in the housing 61. Thus, in the illustrated case, the duct 66 is presupposed to be connected to the line 24 (FIG. 2) via a pipe connection 68, whereas the duct 67 is connected to the line 26 via a pipe connection 69. The ducts 66 and 67 may be communicated with respective ones of a pair of outputs or exits 70 and 71 from the unit 60, as further described below.

The driving force for the relevant control device is taken from the pressure difference established between the exits 70 and 71. Until possibly having a maximum manipulated variable, this pressure difference will increase or decrease proportionally to a change in the net force transferred from the sensor diaphragm 52 to the transfer arm 56. In the illustrated embodiment the control unit is constructed such that even maximum variations in the manipulated variable requires a small diaphragm movement. Further, the is control unit is provided with a valve system 72–74, 75–77 causing the control unit to have the capacity to provide for rapid correcting movements of the final controlling element, even if it should be necessary to use a liquid instead of gas as the driving medium.

It is desirable that the mechanical control unit 60 has stable working conditions, and it is therefore not very favourable that the pressure difference between the ducts 66, 67 may vary strongly. In order to avoid that the control unit becomes less precise because of these variations, the unit is provided with a pressure-stabilising valve means 77–81 seeing that the pressure difference between the inlet duct 66 and the chamber 77, which has an open connection to the exit 71, is kept at a stable level. This pressure difference in the reality is the working pressure for the mechanical control unit, and corresponds to the maximum pressure drop which may be established between the exits 70 and 71. The pressure difference which is maintained by means of the pressure-stabilising valve means, consequently must be chosen sufficiently high that the manipulated variable that can be established, at any time is sufficient in relation to the process which is to be controlled. Said pressure difference may not be larger than the pressure difference applying at any time between the separator chamber and the downstream side of the throttle valve in question. It is therefore important to secure that the pressure drop across the throttle valve never becomes to low. With a correct dimensioning of the throttle valves in relation to the piping connecting the valve in question with the receiving plant for the relevant fluid, one will be able to secure that these always have a minimum pressure drop which can be used for operation of control devices. This will be further elucidated below.

The pressure stabilising valve 77–81 comprises a sensor diaphragm (or a piston) 80 cooperating with a valve body 78. The sensor diaphragm is influenced by a spring 79 having a given preload actuating the diaphragm in the downwards direction. This implies that the valve body 78 will be pressed away from its seat if there is not a sufficiently large pressure difference between the chambers 81 and 77 below and above the sensor diaphragm. In that case this will open for a certain gas flow from the chamber 77, via the duct 67 to the relevant downstream course where the gas is dumped. The gas flow ceases only when the pressure in the chamber 77 again becomes so low relative to the pressure in the chamber 81 that said spring preload does not manage to keep the valve body 78 away from its seat. The pressure difference between the chambers 81 and 77 therefore will be stabilised at a level which will be determined by the preload of the spring 79, and this corresponds, as previously mentioned, to the maximum pressure difference which can be transferred to the final controlling element to be operated by this control unit.

In FIG. 3 the sensor diaphragm 52 is shown in a neutral position. This implies that the valve bodies 62, 63 rest against their respective seats. When the sensor diaphragm 52 is pressed upwards as a result of an increased water level in the chamber part 5, the lever 57 will press the piston 64, and therewith the valve body 62, to the right, so that there is opened for a gas supply from the inlet duct 66 to the chamber 65. This implies a pressure increase in this chamber which will influence the end surface of the piston 64 with a force which is directed oppositely to the force from the lever 57. At the same time the pressure increase will press the valve pistons 72 and 75 to the right. The valve body 73 thereby is pressed with an increased force against its seat, whereas the valve body 76 is pressed away from its seat. This opens for gas flow from the inlet duct 66, via the chambers 77 and 74, to the exit 70. The valve body 76 has a large cross-section, and the pressure at the exit 70 will rise rapidly to approximately the same level as in the chamber 65, even if the final controlling element in question should require a relatively large fluid supply for its function. The pressure in the relatively small chamber 65 will rise rapidly to a level at which the force which influences the right end surface of the cylinder piston 64, balances the oppositely directed force from the sensor diaphragm 52 via the transfer arm 56. This implies that the sensor diaphragm is pressed back to the neutral position, so that the valve body 62 comes to rest against its seat and blocks for a further pressure buildup in the chamber 65, and thereby also for a further pressure buildup on the exit 70. The total pressure increase on the exit 70 in relation to the exit 71 by this will be approximately proportional to the increase of the force generated by the deviation against the sensor diaphragm 52.

When the deviation force against the sensor diaphragm 52 decreases, the diaphragm will be pressed downwards in relation to the neutral position. This is a consequence of the fact that the upwards directed deviation force becomes smaller, whereas the oppositely directed pressure forces from the chamber 65 against the right end surface of the cylinder piston 64 are still equally large, since the cylinder 64 is not connected to the valve body 62. This entails that the lever 57 now will press the valve body 63 away from its seat, so that there is opened for a quick venting from the chamber 65 to the exit 71 until the pressure forces against the right end surface of the cylinder 64 are reduced so that the valve body 63 again closes against its seat.

With a falling pressure in chamber 65, the pressure at the exit 70 is immediately correspondingly reduced, since the pressure difference between the chambers 74 and 65 will push the piston 72 to the left, and thereby vent excessive pressure in that the valve body 73 for a short moment opens a duct having an open connection to the exit 71.

In a corresponding manner as with increasing deviation forces, also decreasing deviation forces will entail that the pressure difference between the exits 70 and 71 decreases proportionally to the reduction in the force generated by the deviation against the sensor diaphragm 52. In the illustrated embodiment of the control unit according to the invention one will therefore be able to maintain an approximately linear connection between deviation and manipulating variable force (up to a maximum manipulated variable).

As shown in FIG. 3, the control unit 60 is also provided with a valve in the form of a spring-loaded valve body 82 arranged in a duct between the inlet duct 66 and the valve chamber 65. This duct communicates with the chamber 77 via a passage, as shown in the figure. It is here the question of a "short-circuit" valve which is arranged to cause a reduction of the driving medium pressure if this should become too high.

FIG. 3 also shows how the control unit 60 may be connected to an actuating drive in the form of an actuator 90. This is here shown to comprise a spring-loaded pilot valve 91 which is arranged to influence a following, non-illustrated final controlling element. To obtain optimum regulating conditions, it is preferable that the actuating drive cooperates with the final controlling element (throttle valve) in question, so that this adjusts itself to a position which is unambiguously determined from the manipulated variable. For example, if one wants to control a viscose coupling between a motor and its pump, the manipulated variable of the actuator should meet a counter force which increases uniformly with an increasing pump power. As an example, there is taken as a starting point that the relevant final controlling elements are dimensioned for a maximum manipulated variable pressure equal to 2 bar, and that one wants to utilise the difference between the pressure in the upper part of the separator chamber and the pressure downstream of the respective valve devices.

The pressure drop across a throttle valve is always smallest when the valve is in the quite open position, and in this position the pressure drop across the valve will constitute a fraction of the total pressure drop in the piping between the separator tank and the receiving plant. By choosing a correct dimensioning of the throttle valves in relation to the piping, the pressure drop across the valves during normal operation will not be able to be less than for example said 2 bar. In some situations the final controlling element will be able to control valve devices wherein the downstream pressure is not suitable to the purpose. Examples hereof is the control of the manipulated variable of the pump as shown in FIG. 2. The downstream pressure of the pump 36 here is higher than the pressure in the separator tank. It will here be of current interest to dump the driving medium for the final controlling element into the downstream course for one of the remaining throttle valves, for example downstream of the throttle valve 21.

Figure 4:
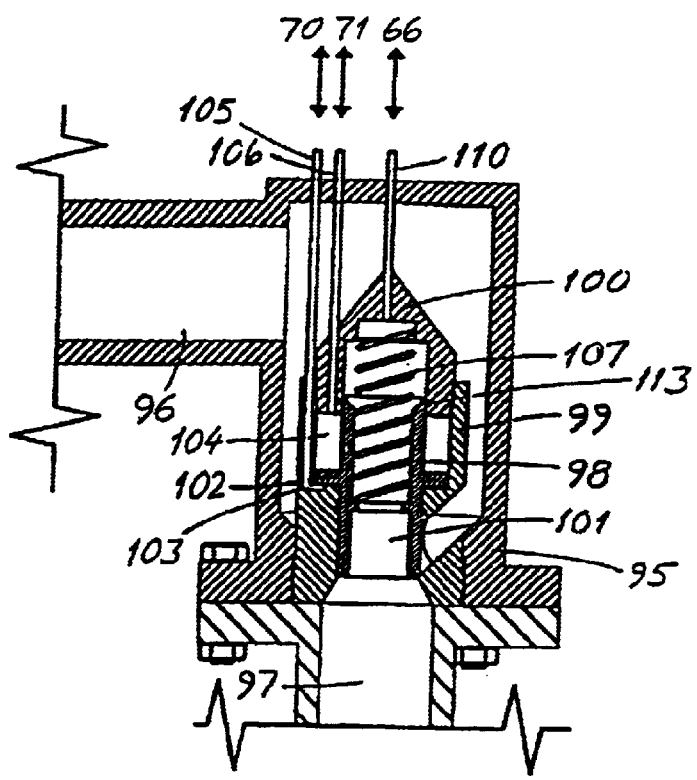
FIGS. 4 and 5 show an embodiment of a control device for use in the system according to the invention, this being specially constructed for cooperation with the mechanical control unit.
Figure 5:
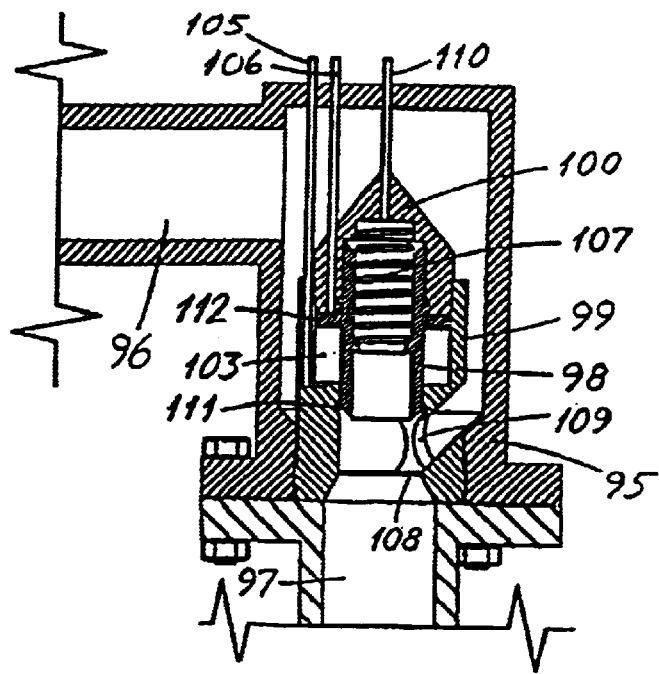

FIGS. 4 and 5 show schematic sectional views of a throttle valve which has been developed especially for cooperating with a mechanical control unit according to the invention. The valve comprises a valve housing 95 having an inlet 96 and an outlet or downstream course 97. Between the inlet and the downstream course there is provided a piston 98 which is slidably arranged in an outer sleeve 99 and the end cover 100 thereof. The piston has an axially through-going opening 101 and is designed such that the pressure in the downstream course 97 of the throttle valve is balanced against the end surfaces of the piston, so that there is not produced any force influence worth mentioning on the piston in the axial direction.

The piston 98 is formed with an outer peripheral flange 102, so that a lower chamber 103 is formed between the flange and the bottom of the sleeve, and an upper chamber 104 is formed between the flange and a lower end surface of the end cover 100 of the sleeve. These chambers communicate with respective channels 105 and 106 for the supply of driving medium from respective ones of the exits 70 and 71 of the control unit 60, as suggested at the top of FIG. 4.

As shown, a relatively strong spring 107 is placed between an inner abutment flange in the piston 98 and an abutment surface on the end cover 100 of the sleeve. The spring 107 at any time will seek to press the piston 98 downwards towards its seat 108. In order to lift the piston up from this seat, it is required that a pressure is established in the chamber 103 which is so much higher than the pressure in the chamber 104 that one gets a lifting force exceeding the spring tension. At a given minimum pressure difference between the two chambers, the piston 98 will be lifted upwards to a position which is determined in that the spring 107 has been compressed such that the spring tension is equally large and directed oppositely to the pressure forces. When the piston is lifted up from the seat 108, there is opened for a downwards directed fluid flow. This will pass along the outside of the sleeve 99, through ports 109 arranged in the sleeve, past the annular opening formed between the piston 98 and the seat 108, to pass thereafter approximately axially through the downstream course 97 of the throttle valve.

The mechanical control unit 60 (FIG. 3) establishes the driving pressure between the exits 70 and 71. This is transferred via the channels 105 and 106 to the chamber 103 and the chamber 104, respectively. The duct 67 of the control unit is connected to the downstream course 97 of the throttle valve via the shown channel 110. Provided that the gaskets 111, 112 and 113 between the piston and the sleeve/end cover are leakage-free, all the consumed driving medium is dumped via the channel 110. The system has no inherent leakage, which implies that driving medium is consumed only when the piston changes position. Provided that the piston 98 is placed vertically and higher than the downstream course 97, the gaskets of the valve will be little subjected to problems as a consequence of contaminations in the through-flowing fluid. This probably functions optimally when using gas as a driving medium, since a gas buffer then will be established within the piston 98. It should otherwise be mentioned at the valve housing 95 does not have to be shaped as a 90° bend as shown in FIGS. 4 and 5. The valve functions equally well if the valve housing for example is shaped as a straight pipe.

In given cases it may be necessary to open up or throttle the fluid supply to the separator tank. This especially applies if pressure or level parameters have come outside of acceptable values. For this purpose one may advantageously apply a valve device which is based on the same driving medium as the above-mentioned valve devices, the driving medium consumed by this valve device being dumped in the downstream course for one of the remaining valve devices.

What is claimed is:

1. A method for controlling a separator unit for multiphase separation of fluids of different densities, wherein either a pressure in the separator unit or a level of one or more of the liquids in the separator unit is adjusted in relation to a reference value, characterised in that the reference value and the relevant pressure in the separator unit, or the level of the relevant liquid converted to a pressure, are supplied to either side of a pressure sensitive mechanical means which moves with deviations of said pressure from the reference value, and that the movement is transferred directly to a mechanical control unit connected to a control device on a fluid outlet from the separator unit, and utilizing the difference between said pressure in the separator unit and the pressure downstream of the control device for moving the device in the desired direction for correcting the deviation.

2. A system for controlling a separator unit (1) for multiphase separation of fluids of different densities, comprising a means for adjusting a pressure in the separator unit (1) or a level of one or more of the liquids in the separator unit in relation to a reference value, characterised in that it comprises a pressure sensitive mechanical means (23; 28; 50) arranged to be supplied with the reference value and the relevant pressure in the separator unit (1), or the level of the relevant liquid converted to a pressure, to opposite sides of said means, and to be moved with deviations of said pressure from the reference value, and a mechanical control unit (22; 33; 60) connected to the mechanical means (23; 28; 50) and to a control device (20; 38; 90) on a fluid outlet (25; 37) from the separator unit (1), and arranged to utilize the difference between said pressure in the separator unit and the pressure downstream of the control device for moving the device in the desired direction for correcting the deviation.

3. A system according to claim 2, characterised in that the mechanical means (50) comprises a pressure sensitive element (52) which is coupled to a transfer element (56, 57) arranged to cooperate with a first valve device (62–64) in the mechanical control unit (60), the valve device (62–64) when influenced by the transfer element (56, 57) being arranged to open for the supply of a driving medium to a valve chamber (65), for producing a counter force on the transfer element (56, 57), so that the pressure sensitive element (52) is returned to a neutral position.

4. A system according to claim 3, characterised in that the valve device (62–64) comprises a first and a second valve body (62 resp. 63) of which the first valve body is arranged to control inflow of driving medium from an inlet duct (66) to said valve chamber (65), and the second valve body (63) is arranged to control outflow of driving medium from the valve chamber (65) to a first exit (71) from the control unit (60), the control unit comprising an additional valve device (72–77) for connection of the inlet duct (66) to a second exit (70) from the control unit (60) under the control of the pressure in said valve chamber (65).

5. A system according to claim 4, characterised in that the additional valve device comprises a first valve unit (75, 76) which is arranged to interconnect the inlet duct (66) of the control unit (60) and its second exit (70) at a given pressure in said valve chamber (65), and a second valve unit (72, 73) which is arranged to interconnect the two exits (70, 71) of the control unit (60) at a pressure reduction in the valve chamber (65).

6. A system according to claim 4, characterised in that the control unit (60) is provided with a pressure-stabilising valve means (77–81) seeing that the pressure difference between the inlet duct (66) of the control unit (60) and said first exit (71) is maintained at a stable level.

7. A system according to claim 4, characterised in that the transfer element (56, 57) comprises a rotatably mounted lever (57) which, with its end portions, is arranged to influence respective ones of the valve bodies (62, 63) of the first valve device.

8. A system according to claim 5, characterised in that the control unit (60) is provided with a pressure-stabilising valve means (77–81) seeing that the pressure difference between the inlet duct (66) of the control unit (60) and said first exit (71) is maintained at a stable level.

9. A system according to claim 5, characterised in that the transfer element (56, 57) comprises a rotatably mounted lever (57) which, with its end portions, is arranged to influence respective ones of the valve bodies (62, 63) of the first valve device.

10. A system according to claim 6, characterised in that the transfer element (56, 57) comprises a rotatably mounted lever (57) which, with its end portions, is arranged to influence respective ones of the valve bodies (62, 63) of the first valve device.

11. A system according to claim 8, characterised in that the transfer element (56, 57) comprises a rotatably mounted lever (57) which, with its end portions, is arranged to influence respective ones of the valve bodies (62, 63) of the first valve device.

* * * * *